United States Patent [19]
Camras

[11] 3,737,568

[45] June 5, 1973

[54] VIDEO RECORDING SYSTEM

[75] Inventor: Marvin Camras, Glencoe, Ill.

[73] Assignee: IIT Research Institute, Chicago, Ill.

[22] Filed: Dec. 13, 1971

[21] Appl. No.: 207,439

Related U.S. Application Data

[62] Division of Ser. No. 344,075, Feb. 11, 1964.

[52] U.S. Cl.........178/6.6 A, 178/7.5 S, 178/69.5 TV, 179/100.2 MD

[51] Int. Cl...........G11b 5/20, G11b 5/44, H04n 5/78

[58] Field of Search..........................178/6.6 A, 7.5 S, 178/69.5 TV

[56] References Cited

UNITED STATES PATENTS 3,065,296 11/1962 Marsden ........................178/69.5 TV 3,342,937 9/1967 Deutsch ........................178/69.5 TV

*Primary Examiner*—Howard W. Britton
*Attorney*—Carlton Hill, Benjamin H. Sherman, Charles F. Meroni et al.

[57] ABSTRACT

In the disclosed embodiments the video signal is recorded on successive longitudinal tracks with high frequency bias. The sound may be recorded transversely on adjacent tracks or may be recorded with the video as pulse modulation in the horizontal blanking intervals. The video bias frequency is selected so as to avoid beat notes with the video signal. The horizontal and vertical sync signals may be amplified separate from the composite video and then added thereto so as to record sync signals of increased amplitude. The picture signal from a television receiver may be recorded without further amplification.

3 Claims, 6 Drawing Figures

PATENTED JUN 5 1973

3,737,568

SHEET 2 OF 2

VIDEO RECORDING SYSTEM

CROSS-REFERENCES TO RELATED APPLICATIONS

The present application is a division of my pending application Ser. No. 344,075 filed Feb. 11, 1964.

My U.S. Pat. No. 3,506,780 discloses and claims pulse modulation techniques for recording sound signals during the horizontal blanking intervals of the video signal.

SUMMARY OF THE INVENTION

This invention relates to a recording and reproducing system and particularly to a magnetic video recording and playback system.

The present invention is particularly concerned with a video recording and playback system wherein the record medium travels at relatively high speed and the video signal is recorded on a succession of narrow audio-video tracks extending lengthwise of the direction of travel of the record medium. An embodiment in accordance with the present invention is capable of providing an hour or more of recording on a seven inch reel of ¼ inch wide magnetic record tape while avoiding the complexity and expense of a rotating type scanning head such as has previously been employed commercially.

It is an object of the present invention to provide an economical video recording and/or playback system wherein the transducer head means scans longitudinally of the direction of movement of the record medium.

It is another object of the present invention to provide a longitudinal scan type video recording and/or playback system providing a relatively long playing time for a given length and width of a magnetic record medium.

Another object of the invention is to provide a video recording system providing reduced noise and which provides an improved picture quality on playback.

A further object of the present invention is to provide a novel magnetic transducer head constructed for efficiently transducing both relatively low frequency signals and relatively high frequency signals.

Other objects, features and advantages of the present invention will be more fully apparent from the following detailed description taken in connection with the accompanying drawings, in which.

Figures 1, 2:
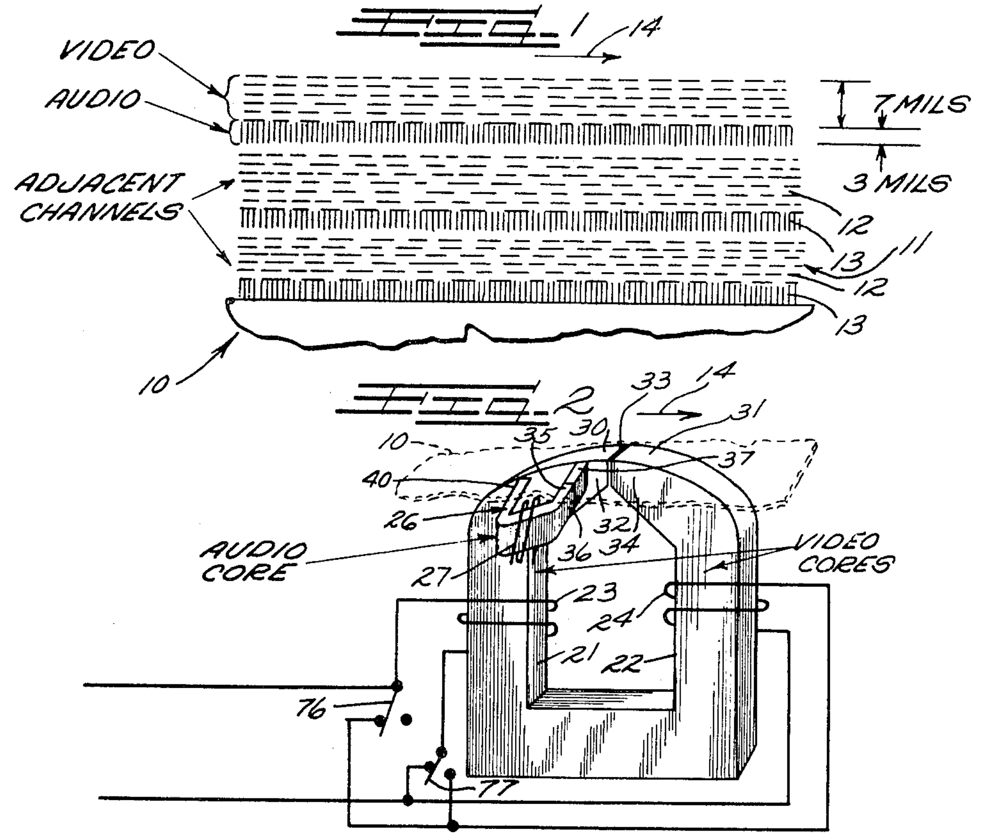
FIG. 1 is a somewhat diagrammatic fragmentary plan view of a magnetic record tape and illustrating diagrammatically the recorded fields of a composite audio-video track and illustrating the relationship of adjacent channels formed of such composite tracks.
FIG. 2 is a somewhat diagrammatic perspective view of a composite audio-video transducer head for recording the composite audio-video tracks of FIG. 1.

FIG. 1 illustrates a magnetic record medium 10 having a series of channels such as indicated at 11 each channel comprising a composite audio-video track including a video portion 12 which is longitudinally recorded and an audio portion 13 which is directly adjacent thereto and is transversely recorded. Thus the fields of the video portion 11 are directed longitudinally of the direction of movement of the record tape 10 which is indicated by the arrow 14 while the recorded fields of the audio portion 13 are preferably at right angles to the direction of travel of the record medium 10. By way of example, the record tape 10 may have a width of one-fourth inch and may provide a total of 20 channels. The composite audio-video track may occupy ten mils of each channel, and the video portion 12 may have a width of seven mils while the audio portion 13 has a width of 3 mils (one mil equals 0.001 inch).

FIG. 2 illustrates a composite audio-video magnetic transducer head for energization to produce the composite audio-video tracks such as illustrated in FIG. 1. The composite head comprises a pair of video core parts 21 and 22 having video frequency signal windings 23 and 24 thereon. The head further comprises an audio core part 26 having an audio frequency winding 27 thereon. In operation, the magnetic record tape 10 travels with its active surface in contact with the polar surfaces 30 and 31 of the core parts 21 and 22 and may travel first over the pOle 32 providing surface 30, then across the gap 33 of non-magnetic material and then across the pole 34 providing the polar surface 31. A polar surface 35 of the pole 36 of the audio core 26 may alSo engage the active undersurface of the record medium and may define a gap of non-magnetic material 37 with an opposing face of the pole 32 of core part 21. The polar surface portion 35 of pole 36 may lie generally flush with the polar surface 30 while adjacent portions of the core 26 may be offset below the surface of the record tape as it travels across the transducer head assembly. The audio winding 27 is, of course, substantially spaced below the active surface of the tape, with respect to the orientation shown in FIG. 2, so as to avoid any undesirable interaction between leakage fields associated with the winding 27 and adjacent channels of the magnetic record tape 10. By way of example, the non-polar end 40 of the audio core 26 may abut against the video core part 21 to complete an audio magnetic circuit. The ends of core parts 21 and 22 remote from the gap 33 may abut each other as indicated to provide a low reluctance magnetic flux path linking the windings 23 and 24.

In other to produce a video track portion 12 having a width of about 7 mils, the width of the core parts 21 and 22 and the transverse dimension of the gap 31 defined by the core parts should be approximately seven mils. The transverse gap defined between pole 36 of audio core 26 and the adjacent portion Of video core part 21 should have a dimension at right angles to the direction of travel of the record medium of about 3 mils to provide an audio track portion 3 mils wide as described in connection with FIG. 1. The thickness dimension of the pole 36 which dimension is in the direction of tape travel is preferably selected to provide a null in response to record wavelengths corresponding to the horizontal sweep frequency of the video signal being recorded. Thus if λ is the recorded wavelength on the record tape corresponding to the line frequency and $n$ is an integer, the effective thickness of the pole 36 in the direction of travel of the record medium should be $n$ λ. This gives a null in the response of the head of FIG. 2 in the audio circuit which tends to prevent interference between the audio and video signals on the tape. If the thickness of the pole 36 is represented by the letter $W$, the tape velocity by the letter $V$, and it is assumed that the line frequency is 15,750 cycles per second, then $W$ equals $(nV)/15,750$.

The record tape 10 is driven in the direction of the arrow 14 across the transducer head of FIG. 2 by any suitable tape transport mechanism. By way of example, if a one-fourth inch wide tape of audio grade material is moved at a speed of 110 inches per second, with 20 tracks and a 7 inch reel, the playing time will be between 40 and 120 minutes depending on the tap thickness. Picture quality will be improved further by proper use of microgap and cross field heads. Higher tape speeds are also feasible since the playing time is still adequate even when reduced by a factor of two or three.

Figure 3:
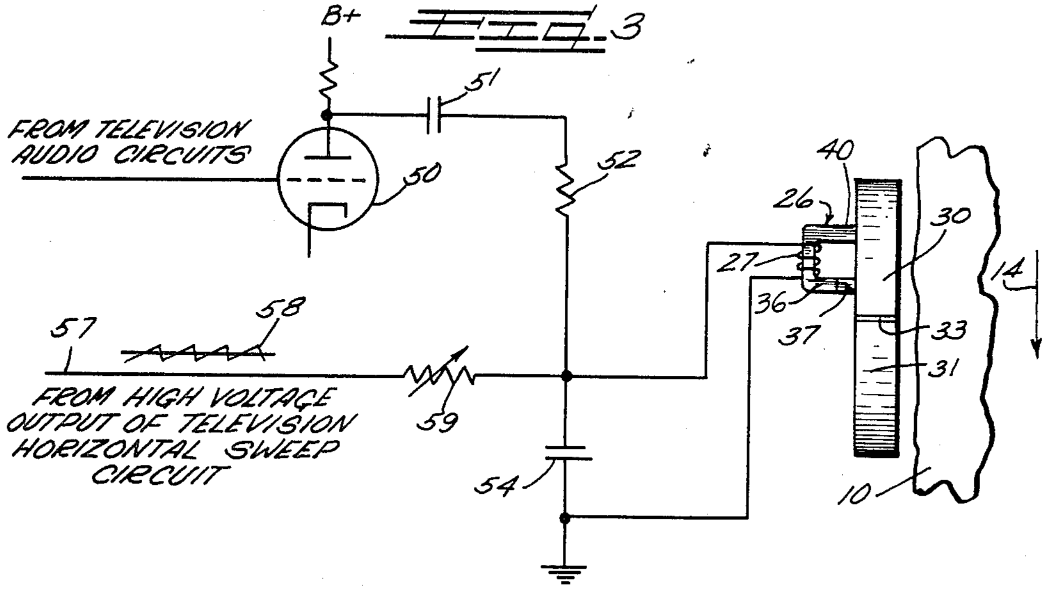
FIG. 3 is a circuit diagram illustrating a preferred audio recording circuit for the head of FIG. 2.

As illustrated in FIG. 3, the audio winding 27 of the audio core 26 is preferably supplied with an audio frequency signal by means of an audio output amplifier stage 50 whose input is coupled to the audio circuit of a television receiver. The audio signal is coupled to the winding 27 by a capacitor 51 and resistor 52 to develop the audio frequency signal across a tuning capacitor 54.

Preferably, the high frequency bias for the audio signal is generated by coupling the capacitor 54 to the high voltage sawtooth output of the television set horizontal sweep generator circuit via line 57. The waveform from the television circuits is indicated at 58 in FIG. 3. A variable resistor 59 is interposed in the line 57 to provide for adjustment of bias amplitude to the optimum level in accordance with known principles. The capacitor 54 in conjunction with the inductance of the head winding 27 provides a tuned circuit which is preferably resonant at a harmonic of the sweep frequency, for example at the third harmonic or 47.25 kilocycles per second. As an alternative, the circuit comprising capacitor 54 and winding 27 may be tuned to the fundamental frequency which under present standards is 15,750 cycles per second. As a further alternative, a series of pulses may be supplied to the winding 27 of constant amplitude and of a relatively high frequency substantially above the audio range to provide the bias signal superimposed on the audio signal from the amplifier stage 50.

Preferably the audio frequencies supplied from the stage 50 to the head winding 27 are equal to or lower than the video line frequency. The transverse recording of the audio signal allows efficient recording even at high tape speeds such as 110 inches per second and provides isolation between the video track portions of adjacent channels.

Referring to FIG. 3, capacitor 51 may have a value of 0.1 microfarad and resistor 52 may have a value of 50,000 ohms. Resistor 59 is adjusted to give a bias current in the head about 10 times as great as the audio frequency head current.

Figures 4, 5, 6:
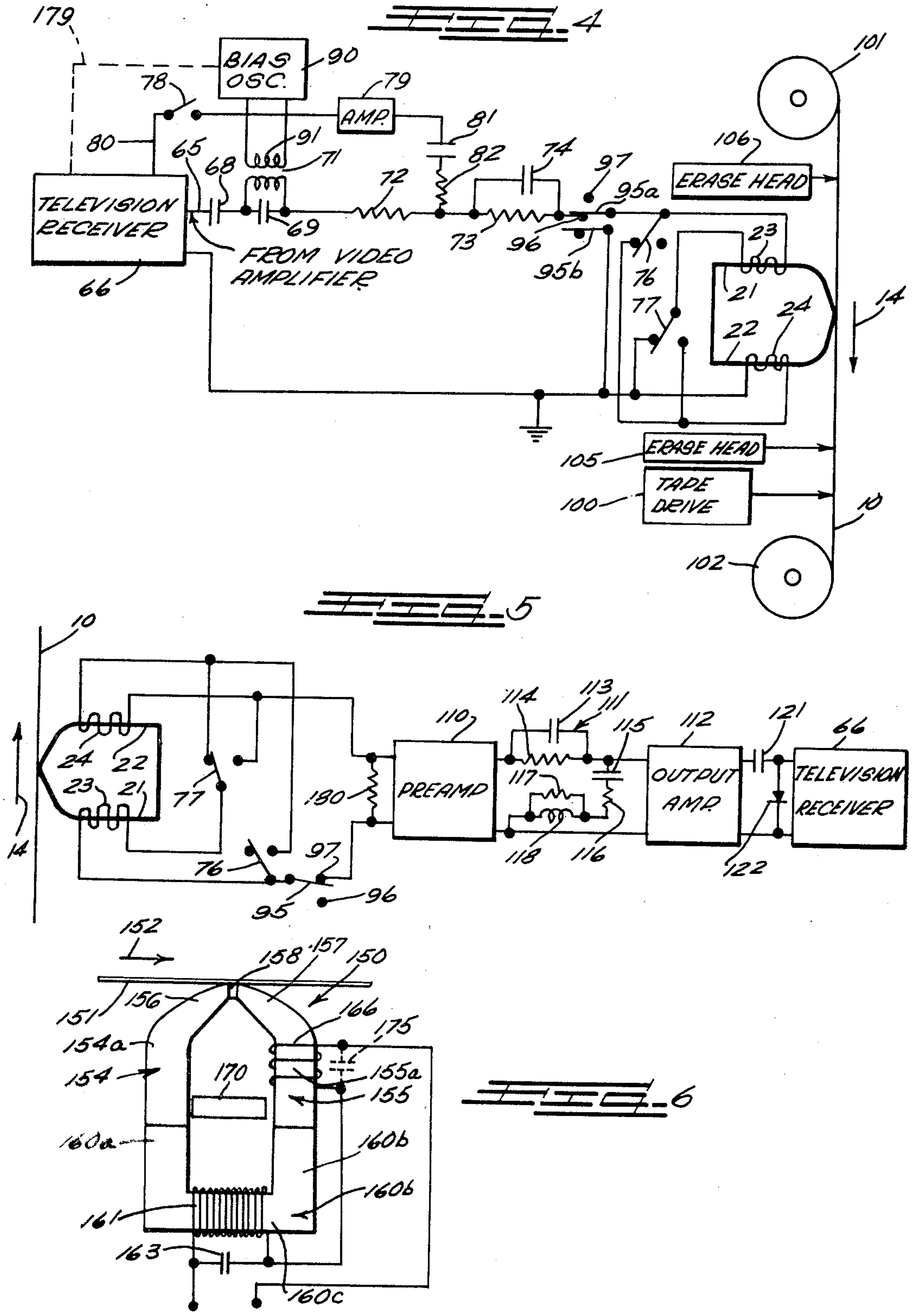
FIG. 4 is a circuit diagram illustrating a preferred video recording circuit for the head of FIG. 2.
FIG. 5 is an electric circuit diagram illustrating a preferred video playback circuit for the head of FIG. 2.
FIG. 6 is a diagrammatic illustration of a modified transducer head capable of recording relatively low frequency and relatively high frequency signals on a single track of a record medium and for electrically reproducing the recorded signals.

FIG. 4 illustrates a preferred video recording circuit for the head of FIG. 2. In this circuit, line 65 is coupled to the output of a video amplifier of a conventional television receiver 66. The video frequency signal is coupled to the windings 23 and 24 in parallel via a capacitor 68, the parallel combination of a capacitor 69 and secondary winding 70 of a transformer 71, resistor 72 and the parallel combination of resistor 73 and capacitor 74. During the recording mode switch means 76 and 77 are in the positions illustrated so as to connect the windings 23 and 24 in parallel during recording.

The horizontal and vertical synchronizing signals may be supplied to line 65 along with the video frequency signal components as a conventional composite signal, or switch 78 may be closed to supply an increased amplitude of the vertical and horizontal sync signals from receiver 66 to line 80. With switch 78 closed, the sync signals would be supplied via amplifier 79, capacitor 81 and resistor 82 to a point intermediate resistor 72 and resistor-capacitor combination 73, 74. In either case the horizontal and vertical sync signals are recorded on the video track portion 12 between the successive lines of the video signal itself.

A bias oscillator 90 is connected to the primary 91 of transformer 71 so as to superimpose a bias frequency signal on the video signal supplied to the head windings 23 and 24. The bias oscillator 90 preferably operates in the megacycle range and preferably operates at a frequency of approximately 3 megacycles per second. From 2 megacycles to 8 megacycles per second may be used and even higher frequencies are possible.

The head windings 23 and 24 are connected in parallel during recording to reduce inductance for operation at the megacycle bias frequencies, but are connected in series during playback for higher output. The switch means 76 and 77 are thus placed in their right-hand positions as viewed in FIG. 4 during playback. Switch 95 has been inserted in the circuit and comprises a movable contact 95*a* engaging stationary contact 96 during recording and engaging stationary contact 97 during playback. Contact 95*b* connects contact 96 to ground during playback to prevent interference in the playback circuits.

The tape drive for the tape 10 is indicated diagrammatically at 100 and may comprise any suitable drive for translating the tape 10 first in the direction of the arrow 14 while one channel of the tape is being scanned and then for translating the tape in the opposite direction as an adjacent channel on the tape is scanned in the opposite direction and so forth. The head comprising parts 21, 22 and 26 is preferably shifted laterally between successive channels at successive reversals of the direction of drive of the tape 10 so that only a single head assembly is required. The tape drive 100 preferably includes an automatic reversal system having switches actuated by means at the opposite ends of the tape 10 to initiate a reversal cycle. The actual reversal preferably automatically takes place during a vertical blanking interval so that it is not visible in the reproduced picture. The changeover is preferably controlled by the vertical synchronizing signal recorded on the tape 10. The reproduced vertical synch signal which causes tape reversal would be the one following actuation of the end of tape sensing switch. The end of tape sensing switch may be actuated by electrical contact material adhered to the tape near the opposite ends thereof. An electronic gate circuit could be opened by a flip-flop circuit when the flip-flop circuit is placed in a "set" condition in response to actuation of the end of tape switch; the gate would then transmit the next reproduced vertical synch pulse to effect tape drive reversal. Instead of electrical contact material on the tape to signal the approach of an end of the tape, a special changeover signal may be recorded on the tape which when reproduced will be transmitted to the electric flip-flop circuit to set the flip-flop.

Resistor 72 in conjunction with the resistor-capacitor capacitor combination 73, 74 may serve as an equalizer for the various components of the video signal and by way of example, resistor 72 may have a value of 6,000 ohms, resistor 73 a value of 10,000 ohms and capacitor 74 a value of 200 picofarads. Capacitor 81 may have a value of 10 picofarads and resistor 82 a value of 2,000 ohms, for example.

Instead of utilizing supply and take-up reels such as indicated at 101 and 102 in FIG. 4 for the tape 10, the tape 10 may be in the form of an endless loop with the head assembly gradually shifted between successive channels in the manner illustrated in my U.S. Pat. No. 2,857,164 issued Oct. 21, 1958. In this type of embodiment, the tape continues to run throughout the recording operation and the shifting of the head takes place gradually at a given point along the tape loop as illustrated in the ninth figure of said U.S. Pat. No. 2,857,164. Of course, if an abrupt transition between successive channels is to be accomplished, then automatic means would be provided for shifting the head during the vertical blanking interval occurring near the desired point on the tape loop with the shifting being triggered by a signal recorded on the tape for this purpose as previously mentioned. Alternatively, the shifting between channels may take place during a transition period with no break in the recorded program.

Suitable channel width erase heads are indicated at 105 and 106 which are successively energized in accordance with the direction of tape movement so as to insure an erased channel prior to recording regardless of the tape direction. Such channel type erase heads would have a width of the order of twelve mils for the example given. An additional demagnetizing head of width to erase the entire tape could be provided for reducing the noise level between tracks. In the example given such an erase head would have a width of the order of 250 mils.

FIG. 5 illustrates a playback circuit utilizing the same head assembly as in FIGS. 2, 3 and 4. During playback, the windings 23 and 24 are connected in series by means of switch 77 and the windings are coupled via a preamplifier 110 and an equalizer network 111 to an output amplifier 112. The network 111 may comprise a shunt combination of a capacitor 113 and a resistor 114, and a shunt circuit comprising a capacitor 115, a resistor 116 and a parallel combination of a resistor 117 and inductance 118. By way of example resistor 114 may have a value of 10,000 ohms, capacitor 115 a value of 0.002 microfarads, resistor 116 a value of 800 ohms and inductor 118 a value between 0.02 millihenries and 1 millihenry. Resistor 117 may have a resistance value comparable to that of resistance 116.

The output amplifier 112 is coupled to the video input of the TV receiver 66 via a capacitor 121 and a shunt arranged diode 122. By way of example the capacitor 121 may have a value of from 0.01 microfarad to 1.0 microfarad and the diode 122 may be a type 1N35.

SUMMARY OF OPERATION

During recording mode as illustrated in FIG. 4, the switch arm 98*a* makes contact with the stationary contact 96 to supply the video signal from receiver 66 via line 65 to windings 23 and 24 of the video core parts 21 and 22 in parallel. High frequency bias having a frequency of the order of three megacycles per second is superimposed by means of transformer 71 on the video signal. Horizontal and vertical synchronizing signals are preferably supplied to the windings 23 and 24 via line 65 along with the video frequency component.

During drive of the tape 10 in the direction of the arrow 14 in FIG. 4, erase head 106 may be energized, while upon reversal of the direction of tape drive 100, erase head 105 may be energized. The erase heads preferably produce high frequency erase fields having frequencies of at least about five megacycles per second and of amplitude to effectively reduce the level of magnetization of the tape to zero prior to the video recording step. Upon reversal of the direction of tape drive, the head assembly illustrated in FIGS. 2 and 4 may be shifted laterally to scan a further channel on the record medium so as to produce a succession of composite audio-video tracks running in opposite directions as illustrated diagrammatically in FIG. 1. The audio track portion 13, FIG. 1, is recorded at right angles to the direction of movement of the tape for efficient audio recording even at high tape speeds of the order of 110 inches per second, and the transversely recorded audio track portions give isolation between the video track portions such as indicated at 12 in FIG. 1.

The tape 10 may be one-fourth inch wide and of audio grade material and when operated at 110 inches per second may provide a playing time of 40 – 120 minutes for the width of channels specifically disclosed herein. The high frequency bias is introduced and its frequency selected so as to avoid beat notes with the video recording current, and with the television receiver radio frequency and intermediate frequency circuits.

The windings 23 and 24 are connected in parallel during recording to reduce inductance for operation at the megacycle bias frequencies, but are connected in series for higher output during playback by means of the switch means indicated at 76 and 77.

The thickness dimension of the audio recording pole indicated at 36 in FIG. 2 is selected to give a null in response at the line frequency so as to tend to prevent interference between the audio and video signals on the tape during playback. The audio circuit bias may be derived from the television receiver sweep circuits so as to avoid interference and eliminate the need for an oscillator. In the specific circuit illustrated, a capacitor 54 tunes the head winding to a resonance, preferably at a harmonic of the sweep frequency to given an improved waveform at, for example, 47.25 kilocycles per second for a line frequency of 15,750 cycles per second.

FIG. 6 illustrates a head 150 for recording both relatively low frequency signals and relatively high frequency signals on a magnetic tape 151 moving in the direction of arrow 152. The head may comprise a pair of core parts 154 and 155 of relatively low eddy current loss magnetic material such as ferrite providing a pair of pole portions 156 and 157 having a gap 158 therebetween of non-magnetic material. The lower yoke 160 preferably has moderate or relatively low losses in the low frequency range but relatively high losses at the high frequency range.

The winding 161 on the yoke 160 has a large number of turns for providing a relatively large playback voltage at low frequencies. The winding 161 resonates, either by virtue of leakage capacity or by virtue of a tuning capacitor 163, at a frequency below the maximum required band width for the system.

As the higher frequencies of the band width, winding 166 with fewer turns is effective and supplies the major part of the output of voltage through the capacitance 163.

Winding 161 is placed such that there is a relatively appreciable leakage in its coupling to the gap 158. Coil 166 is placed such that there is relatively a minimum of leakage in its coupling with the gap and a leakage which is substantially less than that with respect to the winding 161. This may be done by placing winding 161 farther from the gap 158 along the magnetic circuit than winding 166; for example, winding 161 can be on the bottom leg of yoke 160 as illustrated and/or winding 161 can be partially magnetically shunted as by means of a shunt piece 170. The piece 170 may, of course, be of relatively high permeability "magnetically soft" material.

If winding 161 has ten times the number of turns of winding 166 and a resonant frequency of 30 kilocycles per second, then at a drop of 12 decibels per octave or 40 decibels per decase beyond resonance, the output of winding 161 would be 40 decibels down at 300,000 cycles per second. The smaller winding 166, if resonant itself or with circuit capacitance as indicated at 175, may have a resonance frequency above 300,000 cycles per second. Because of the fewer number of turns its direct voltage is one-tenth that which might be possible with winding 161, so that its output is 20 decibels down instead of 40 decibels. The net gain with this winding arrangement is 20 decibels at high frequencies under these conditions. At 1.2 megacycles per second the output from winding 161 is 40 plus 24 equals 64 decibels down. If winding 166 has 1/40 the turns of winding 161 to give a minimum resonance frequency of 1.2 megacycles per second for winding 166, the output of winding 166 is 32 decibels down because of the fewer number of turns thereof, giving a net improvement of 32 decibels. At the same time the winding 161 gives a large low frequency output, reducing amplifier requirements and noise level, and requiring less low frequency equalization. The head is especially useful for video recording where many octaves of band width are necessary. The winding 166 may be distributed to each of the leg portions **154*a* and 155*a* and the winding 161 may be distributed to the leg portions 160*a* and 160*b* of yoke 160 instead of being on the base leg 160*c***.

The capacitor 175 in FIG. 6 has been shown dotted to represent the stray capacity shunting winding 166. The capacitor 163 may also consist entirely of the stray capacitance of the winding 161, or the stray capacitance of the winding 161 may be supplemented by an external capacitor as indicated at 163 in FIG. 6. The head of FIG. 6 for simplicity may be of one material such as "Permalloy" and still advantageously utilize the windings 161 and 166 having the respective positions and numbers of turns as previously described.

As an alternative, the arrangement of FIG. 4 may be utilized to record both the video portion of the signal and the audio portion. By way of example, the line 80 from the horizontal sync of the television receiver may be connected to a pulse width modulator controlled by the audio signal. Alternatively, the audio signal may be inserted just after and/or just prior to the horizontal blanking interval so that the audio is in effect being recorded by using a narrow part of the edge of the picture being transmitted. In this event, the audio and video portions of the signal would be recorded in successively opposite directions along successive adjacent channels utilizing the tape driving and automatic reversal methods previously described.

While suitable circuit values and other parameters have been mentioned previously herein, the following are the preferred parameters at the present time. In FIG. 1, a one-fourth inch tape may preferably have 10 to 12 channels each having a video track portion 14 mils in width and an audio track portion 3 mils in width. From 3 to 8 mils spacing is thus provided between tracks where the tape is nominally 246 mils wide. The core parts 21 and 22 would, of course, have a width of 14 mils approximately for recording this width of video track portion, and the gap material 37 would have a transverse dimension of approximately 3 mils to provide an audio track portion of 3 mils in width. The dimension of the pole portion 36 in the direction of tape travel is as previously described.

Referring to FIG. 4, the presently preferred circuit includes a capacitor 68 of 1.0 microfarad, a resistor 73 of 50,000 ohms and a capacitor 74 of 8 picofarads (1 picofarad equals 1 micromicrofarad). In the preferred circuit, the resistor 72 is omitted or short circuited. As previously described, the horizontal and vertical sync signals may be supplied to the head windings 23 and 24 via conductor 80 with the amplifier 79 inverting the polarity of the pulses if necessary, and providing greater output if necessary. However, the preferred arrangement is with the switch 78 open and the conductor 65 connected to a point in the video circuits where the composite video signal is present including the horizontal and vertical synchronizing components.

A preferred high frequency bias source 90 in FIG. 4 provides an output frequency synchronized with the audio frequency carrier of the television receiver. Under present standards in the United States the bias oscillator 90 is preferably operated at 4.5 megacycles per second and is preferably locked to the audio carrier frequency of the television receiver 66. Such a coupling between the audio stage of the receiver 66 and the bias oscillator 90 is indicated diagrammatically by the dash line 179 in FIG. 4. The high frequency bias oscillator 90 may also operate at a multiple or submultiple of 4.5 megacycles per second, for example 2.25 megacycles per second or 9 megacycles per second, locked to the audio carrier frequency of the television receiver 66 so as to avoid interference, or tuned to a frequency that avoids interference.

With respect to FIG. 5, it is found to be preferable to include a resistor 180 having a value of about 50,000 ohms across the head windings 23 and 24 to reduce the resonant peak in the response characteristic of the head. The preferred circuit parameters for the arrangement of FIG. 5 includes a resistor 180 of 50,000 ohms, a capacitor 113 of 200 picofarads, a resistor 114 of 1,200 ohms, a capacitor 115 of 0.05 microfarads, a resistor 116 of 33 ohms, a resistor 117 of 1,000 ohms and an inductance 118 of 50 microhenries. Resistor 117 may be omitted. The arrangement of the series RC shunt combination including capacitor 113 and resistor 114, in conjunction with the RLC shunt circuit including capacitor 115, resistor 116 and inductor 118 constitutes a highly advantageous equalizer circuit for the playback system. The addition of the diode circuit including capacitor 121 and diode 122 further improves the response of the system in conjunction with the equalizer network 111.

With respect to the playback circuit of FIG. 5, it is possible to introduce some of the output from the longitudinal video track circuit into the audio circuit of FIG. 3 (and/or vice versa) to cancel any stray magnetic pickup from the video track by the audio head (and/or from the audio track by the video head). The coupling from the video circuit into the audio circuit may be through low pass filters and phase shifters if necessary to secure best balance.

The video cores 21, 22 may be formed of 0.5 mil "Permalloy" laminations having a width dimension in the plane of FIG. 2 of about one-half inch, for example. The laminations would be stacked to provide the desired depth of 7 mils or preferably 14 mils. The video windings 23, 24 may each have 100 to 600 turns while the audio coil 27 may have 2,000 turns, for example.

Referring to an arrangement such as illustrated in FIG. 4, a direct current bias may be supplied to the windings 23 and 24 so as to cause the video frequency components of the applied signal to be recorded on a relatively linear positively sloping portion of the $B_R$ versus H curve of the magnetic material of tape 10. The horizontal and vertical synchronizing pulse could be supplied via amplifier 79 so as to have a relatively large amplitude and a polarity opposite to the direct current bias supplied to the windings 23 and 24 so that the synchronizing pulses would be recorded on a linear negatively sloping portion of the $B_R$ versus H curve of the magnetizable material of the tape (with an opposite polarity of magnetization as compared to the bias video frequency components).

It will be understood that the use of magnetic keepers generally as shown in my U.S. Pat. Nos. 2,549,771 and 2,561,338 may be desirable with the heads shown in FIGS. 2 and 6. Further, the use of cross field type heads as disclosed in my U.S. Pat. Nos. 2,628,285, 2,803,708 and 3,013,123 and in my pending application Ser. No. 126,121 filed July 24, 1961 is very desirable in order to give the highest possible resolution. The tape drive 100 may comprise capstans on each side of the head assembly with cooperating pinch rollers having a very fast operating speed for quick reversal of the tape.

Excellent operation has been obtained in the circuit of FIG. 5 with a minimum bias field amplitude and with a relatively strong video signal amplitude.

"Permalloy" may have a composition of 4 percent molybdenum and 78 percent nickel and the remainder iron and minor constituents.

It will be apparent that many modifications and variations may be effected without departing from the scope of the novel concepts of the present invention.

I claim as my invention:

1. A video transducer system comprising a non-rotating magnetic transducer head arranged to scan a moving magnetic record tape in the logitudinal direction for recording a video signal along a logitudinal channel thereof, a video recording circuit for supplying a video signal to be recorded to said magnetic transducer head, and a high frequency bias circuit for generating a megacycle frequency bias signal and for supplying the same to said magnetic transducer head during recording, the video recording circuit including an amplifier means for connection with the sync signal circuits of a television receiver so as to supply an amplified sync signal to the transducer head, said video recording circuit supplying said video signal from the television receiver to the transducer head without further amplification.

2. A video recording system comprising a source of a composite video signal including successive lines of a picture signal and vertical and horizontal synchronizing signals, a video recording head for coupling to a magnetic record medium, and a video recording circuit connected with said source and with said recording head during recording operation for supplying the successive lines of said picture signal to said recording head for recording on said magnetic record medium, wherein the improvement comprises means connected with said source and with said video recording circuit for adding to the picture signal a separate synchronizing signal including vertical and horizontal synchronizing portions to supply to the video recording head vertical and horizontal synchronizing portions of increased amplitude in comparison to those of said composite video signal, for recording on the record medium between the successive lines of the picture signal.

3. In a video transducer system including a broadcast television receiver having a first circuit point for supplying a video signal and having a second circuit point for supplying vertical and horizontal synchronizing signals, and a video recording head for coupling to a magnetic record medium, a video recording circuit connected with said first circuit point and with said video recording head for supplying said video signal to said head for recording on said magnetic record medium, and circuit means connected with said second circuit point and with said video recording circuit and comprising an inverter for supplying said vertical and horizontal synchronizing signals with inverted polarity to said video recording head for recording on said magnetic record medium on the same channel as said video signal.

* * * * *